United States Patent

Yoshitsugu et al.

[11] Patent Number: 5,708,520
[45] Date of Patent: Jan. 13, 1998

[54] ROTATING POLYGON MIRROR DRIVING APPARATUS

[75] Inventors: Takao Yoshitsugu, Yonago; Koichiro Ohata, Tottori-ken; Tsuyoshi Kano, Yasugi, all of Japan

[73] Assignee: Matsushita Electric Industrial Co., Ltd., Osaka, Japan

[21] Appl. No.: 661,644

[22] Filed: Jun. 11, 1996

Related U.S. Application Data

[62] Division of Ser. No. 162,956, Dec. 8, 1993, Pat. No. 5,555,124.

[30] Foreign Application Priority Data

| Dec. 15, 1992 | [JP] | Japan | 4-334155 |
| Dec. 15, 1992 | [JP] | Japan | 4-334156 |
| Dec. 15, 1992 | [JP] | Japan | 4-334157 |

[51] Int. Cl.[6] .................................. G02B 26/08
[52] U.S. Cl. .................. 359/200; 359/198; 310/90; 384/100; 384/123
[58] Field of Search .................. 359/198–200, 359/216–219; 310/90, 905; 384/114–115, 121–123, 244–246, 118, 100

[56] References Cited

U.S. PATENT DOCUMENTS

| 4,652,149 | 3/1987 | Nakaoka et al. | 384/100 |
| 5,277,499 | 1/1994 | Kameyama | 384/24.5 |
| 5,555,124 | 9/1996 | Yoshitsugu et al. | 359/200 |

FOREIGN PATENT DOCUMENTS

| 61-118720 | 6/1986 | Japan . |
| 3100619A | 4/1991 | Japan . |
| 4231718A | 8/1992 | Japan . |

*Primary Examiner*—James Phan
*Attorney, Agent, or Firm*—Watson Cole Stevens Davis, P.L.L.C.

[57] ABSTRACT

A rotating polygon mirror driving apparatus has a rotor having a rotating polygon mirror fixed thereto, a rotational shaft and a rotor magnet; a bracket having a base plate provided opposite to the rotor magnet and a collar forming a bearing holding portion of a resin outserted to the base plate and made; and a bearing fitted to the bracket so as to support the rotational shaft. The driving apparatus can be decreased in cost and thickness while maintaining excellent rotational precision and mechanical precision.

5 Claims, 2 Drawing Sheets

ROTATING POLYGON MIRROR DRIVING APPARATUS

This is a division of application Ser. No. 08/162,956 filed Dec. 8, 1993, now U.S. Pat. No. 5,555,124.

BACKGROUND OF THE INVENTION

1. Field of the Invention

The present invention relates to a rotating polygon mirror driving apparatus used for laser scanning in a laser beam printer (referred to as "LBP" hereinafter).

2. Description of the Prior Art

Recently, there have been increasing demands for decreasing the size, thickness and cost of a rotating polygon mirror driving apparatus as LBP's have been popularized. In this situation, attempts are made to decrease the thickness and cost by fixing an aluminum or brass sleeve to, for example, an iron substrate, in place of a conventional bracket made of an aluminum die casting or the like. However, it is necessary to prevent occurrence of rational fluctuations (referred to as "jitter" hereinafter), noise or a tilt of a rotating polygon mirror to maintain high-precision performance. The measure of using a fluid bearing as a bearing is made to attempt to increase the precision.

Examples of conventional rotating polygon mirror driving apparatuses are described below with reference to FIGS. 3 and 4.

(First conventional example)

FIG. 3 shows the arrangement of an example of the conventional rotating polygon mirror driving apparatuses. In FIG. 3, reference numeral 1 denotes a rotational shaft to which a rotor boss 5 is fixed by a method of shrinkage fit or the like. A rotating polygon mirror 2, a rotor magnet 3 and a rotor yoke 4 are fixed to the rotor boss 5 fixed to the rotational shaft 1 to form a rotor 13. To a bracket 7 having a mounting surface 7a for the rotating polygon mirror driving apparatus are fixed a sleeve 10 rotatably supporting the rotational shaft 1, a stator yoke 6 provided opposite to the rotor magnet 3 so as to form a magnetic path, and a stator base 9 which is provided between the stator yoke 6 and the rotor magnet 3 and to which a stator winding 8 for energizing the rotor magnet 3 is fixed.

The sleeve 10 is a fluid bearing and has a thrust bearing 18 which is fixed to one end surface thereof and which has a spiral groove for generating thrust dynamic pressure. A herringbone groove for radial support is formed in either the rotational shaft 1 or the sleeve 10. The thrust bearing 18 and the sleeve 10 are lubricated by grease and oil, respectively, as lubricants, and form dynamic pressure fluid bearings. The thrust bearing 18 generally has a groove formed by etching or the like and is made of a rigid material such as stainless steel in order to obtain sufficient precision.

(Second conventional example)

FIG. 4 shows a second conventional example in which a bracket 14 used for thinning and improving strength comprises a base 11 comprising a magnetic material and having a mounting surface 11a for the rotating polygon mirror driving apparatus, and a collar 12 which is caulked in the base 11 and to which the sleeve 10 is fixed. The base 11 is provided opposite to the rotor magnet 3 to form a magnetic path.

The operation of the rotating polygon mirror driving apparatus having the above arrangements is described below. When current is supplied to the stator winding 8, electromagnetic force is generated between the stator winding 8 and the rotor magnet 3 to rotate the rotor 13.

At this time, in the second example, dynamic pressure is generated between the sleeve 10 and the rotational shaft 1 and between the trust bearing 18 and the shaft 1 to flat the rotational shaft 1 in a non-contact state. Since the floating properties depend upon the mechanical precision such as the precision of the right angle between the rotating shaft 1 and the thrust bearing 18 and the flatness of the thrust bearing 18, and the magnetic balance between the rotor magnet 3 and the rotational shaft 1, a high level of assembly technique is required.

In these examples, the rotational precision of the rotor 13 and the mechanical precision (referred to as "absolute mirror tilt" hereinafter) of the rotational shaft 1 with respect to the mounting surface for the rotating polygon mirror driving apparatus are determined by the precision of the sleeve 10 fixed to the bracket 7 or the collar 12 and by the precision of fixing of the collar 12 to the base 11. These precisions determine the precision of the dynamic characteristics of the rotating polygon mirror 2. For maintaining the precisions, it is thus necessary to process the bracket 7 and the collar 12 with high precision.

However, the above-described conventional examples have the following problems:

(1) Since the aluminum die casting of the bracket 7 is deformed by the effects of a chuck during processing because the die casting is thin, the right angle of the sleeve 10 with respect to the mounting surface 7a cannot be maintained in addition, when the collar 12 is caulked in the base 11, it is difficult to fix the collar 12 to the base 11 at right angles because of the deformation of the base 11.

(2) The precision of the sleeve 10 deteriorates due to the effects of the roundness of a portion of the bracket 7 or the collar 12 to which the sleeve 10 is fixed. Further, since the coefficient of linear expansion of aluminum is as large as $27 \times 10^{-6}$, the bore precision of the sleeve 10 deteriorates at a low temperature because the sleeve 10 is tightened, thereby interfering with the generation of dynamic pressure and adversely affecting the floating properties due to deterioration in the squareness between the thrust bearing 18 and the bore of the sleeve 10. As a result, the jitter and mirror tilt are increased, and the reliability deteriorates. Similarly, looseness occurs in the caulked portion between the base 11 and the collar 12.

Particularly, since the sleeve 10 is generally made of a soft material such as brass or the like, the precision of the bearing bore diameter significantly deteriorates, thereby significantly adversely affecting the reliability.

(3) The thrust bearing 18 must be maintained in a state where it is floated by a small amount (about 2 to 10 μm) for suppressing the variations in the thrust direction and variations of the height of the rotating polygon mirror, and providing the bearing 18 with rigidity sufficient to overcome the magnetic force generated in the thrust direction. The parts must thus be processed with high precision. In addition, since the rotating polygon mirror driving apparatus is used within a wide temperature range, particularly, if the floating amount of the thrust bearing 18 is decreased due to decrease in the viscosity of thrust grease at a high temperature, the thrust bearing 18 contacts the rotational shaft 1, thereby significantly deteriorating the reliability.

(4) Since the thrust bearing 18 is in surface contact with the rotational shaft 1 for obtaining a sufficient floating amount, the torque loss is increased, and the power consumption of the rotating polygon mirror driving apparatus is thus increased. In addition, since high-viscosity grease is generally used for improving the reliability, the loss is, of course, further increased.

SUMMARY OF THE INVENTION

An object of the present invention is to solve the above problems of the conventional apparatus and provide a rotating polygon mirror driving apparatus which permits realization of decreases in the cost and thickness without deteriorating the precision of bearings.

In order to achieve the object, a rotating polygon mirror driving apparatus of the present invention comprises a rotor having a rotating mirror fixed thereto, a rotational shaft with a rounded tip and a rotor magnet; a bracket comprising a base plate provided opposite to the rotor magnet and a collar serving as a bearing holding portion made of a resin outserted to the base plate; a sleeve fitted and fixed to the bracket so as to support the rotational shaft; a dynamic pressure fluid bearing formed on either the rotational shaft or the sleeve and having a herringbone groove for generating dynamic pressure; and a thrust plate fixed to the sleeve so as to contact the rounded tip of the rotational shaft.

In this arrangement, even if the base plate is warped, the right angle of the collar can be maintained by outserting the collar to the base plate, thereby preventing the absolute mirror tilt. In addition, since the collar is made of a resin and thus has a rigidity of ¼ to ⅛ of that of aluminum, excellent rotational performance can be realized without deteriorating the precision of the sleeve inserted into the collar. Further, since the base plate forms a magnetic path, an attempt can be made to decrease the thickness of the apparatus. Particularly, when the bearing inserted into the collar is a copper-based fluid bearing sleeve, the coefficient of linear expansion of the collar can be adjusted to a value between about $20 \times 10^{-6}$ of the sleeve and $12 \times 10^{-6}$ of an iron plate as the base plate according to the intended purposes. It is thus possible to decrease the effects of a change in the collar precision on the holding power between the collar and the base plate and on the sleeve within the range of a low temperature to a high temperature.

Further, when the thickness of the rotating polygon mirror is set to a value slightly greater than the operational range of the mirror, the change in the height in the thrust direction is permissible, whereby a low-cost and low-loss pivot bearing can be used.

DESCRIPTION OF THE PREFERRED EMBODIMENTS

An embodiment of the present invention is described below with reference to the drawings.

Figure 1:
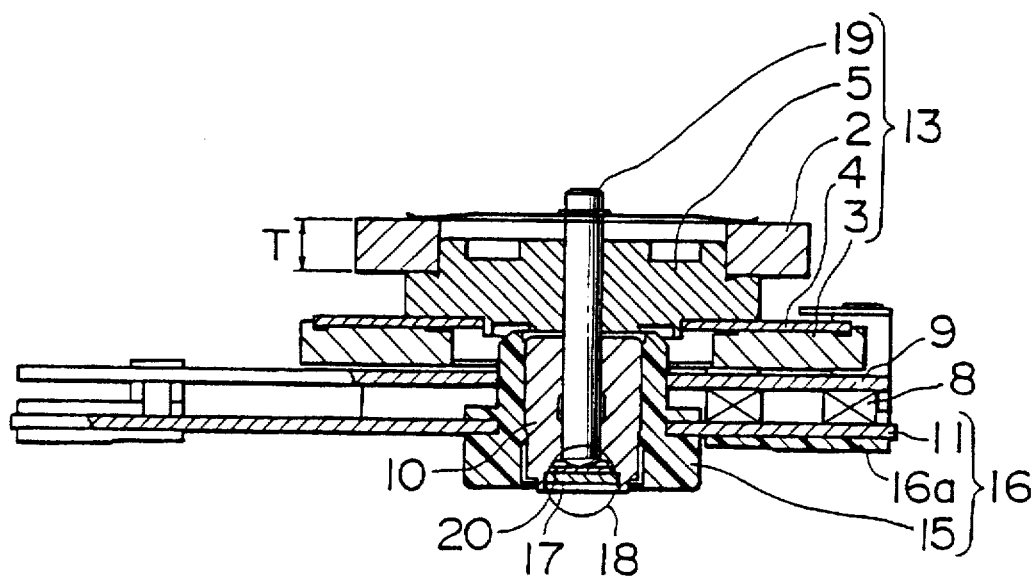
FIG. 1 is a sectional view of a rotating polygon mirror Living apparatus in accordance with a first embodiment of the present invention.

In FIG. 1, reference numeral 19 denotes a rotational shaft to which a rotor boss 5 is fixed by a shrink fitting method or the like. A rotating polygon mirror 2, a rotor magnet 3 and a rotor yoke 4 are fixed to the rotor boss 5 fixed to the rotational shaft 19 to form a rotor 13. A bracket 16 having a mounting portion 16a for a rotating polygon mirror driving apparatus comprises a base plate 11 made of a magnetic material which forms a magnetic path together with the rotor magnet 3, a collar 15 of a resin integrally outserted to the base plate 11, and the mounting portion 16a. To the bracket 16 are fixed a sleeve 10 rotatably supporting the rotational shaft 19 and a stator base 9 to which a stator winding 8 is fixed for energizing the rotor magnet 3 between the base plate 11 and the rotor magnet 3. The sleeve 10 has the herringbone groove formed in the bore thereof so as to radially support the rotational shaft 19. A thrust plate 20 in contact with a rounded tip of the rotational shaft 19 and a thrust cover 17 are fixed to one end of the sleeve 10 so as to rotatably support the rotational shaft 19.

Laser light is applied to the rotating polygon mirror 2 for scanning. The thickness T of the rotating polygon mirror 2 is set so as to satisfy the condition, T>ΘD, wherein ΘD is the diameter of the laser spot applied to the mirror 2.

The operation of the rotating polygon mirror having the above arrangement is described below.

When current is supplied to the stator winding 8, electromagnetic force is generated between the stator winding 8 and the rotor magnet 3 to rotate the rotor 13. A dynamic pressure is thus generated by the function of the herringbone groove formed in the bore of the sleeve 10 to radially float the rotational shaft 19. At this time, the jitter and the absolute tilt of the rotating polygon mirror 2 are determined by the precision of the sleeve 10 and the squareness of the bore of the sleeve 10 with respect to the mounting portion 16a.

On the other hand, since the rigidity of the collar 15, for example, made of PPS to which the bearing sleeve 10 is press-fitted is about ¼ to ⅛ of that of aluminum and is lower than that of the sleeve 10, a change in the bore diameter of the sleeve 10 can be controlled to be about 1/20 to 1/40 of the press fitting margin (if the press fitting margin is 20 μm, the diameter change is as small as about 0.5 μm). Further, the base plate 11 is generally formed by punching a rolled steel plate using a press, and the high precision thereof cannot easily be obtained because the material itself is warped. However, since the warping and distortion are absorbed by integrally outserting the collar 15 and the mounting portion 16a to the base plate 11, the right angle of the collar 15 with respect to the mounting portion 16a of the base plate 11 can be maintained.

The sleeve 10 is generally formed of a copper-based material. The coefficient of linear expansion of the collar 15 is set to be between those of the sleeve 10 and the base 11 by controlling the amount of the glass fibers contained in the resin of the collar 15 so that the precision can be maintained within a wider temperature range.

Although the thrust plate 20 in contact with the rounded tip of the rotational shaft 19 is worn by rotation of the rotational shaft 19 so that the height of the rotor 13 is gradually decreased, the laser spot does not deviate from the rotating polygon mirror 2 because the thickness T of the rotating polygon mirror 2 is set so as to satisfy the condition, T>Θd where Θd is the diameter of the laser spot applied thereto, thereby causing no difficulties in actual scanning of the laser. In fact, assuming that the abrasion loss of the thrust plate 20 is Δt, it is preferable that T≧Θd+Δt.

For decreasing the cost of the rotating polygon mirror 2, it is preferable that the thickness T of the rotating polygon mirror be as small as possible and thus that the abrasion loss Δt be as small as possible. In this embodiment, since the pivot bearing 18 makes a point contact and thus causes a small loss, a lubricant having a viscosity higher than that of the lubricant used in the sleeve 10 can be used, thereby decreasing the abrasion loss Δt. On the other hand, although it is thought that the lubricant used in the sleeve 10 enters the pivot bearing 18, the use of the same kind or the same lubricant as that for the pivot bearing 18 can ensure compatibility between the lubricants and prevent chemical reaction therebetween, thereby further improving the reliability.

As described above, this embodiment comprises the rotor having the rotational shaft having the rounded tip, the rotor magnet and the rotating polygon mirror fixed thereto; the bracket comprising the base plate provided opposite to the rotor magnet, the collar serving as the bearing holding portion made of a resin and outserted to the base plate, and the mounting portion; and the sleeve fitted to the bracket so as to support the rotational shaft. The dynamic pressure fluid bearing having the herringbone groove for generating dynamic pressure is formed on one of the rotational shaft and the sleeve, and the thrust plate is fixed to the sleeve so as to contact the rounded tip of the rotational shaft. The rotating polygon mirror driving apparatus having excellent rotation precision and mechanical precision can therefore be obtained at a low cost.

Although, in the described embodiment, the apparatus comprises the rotational shaft and the fixed sleeve, a rotating sleeve type apparatus comprising a shaft held by a collar and a sleeve fixed to a rotor provides the same effects.

Figure 2:
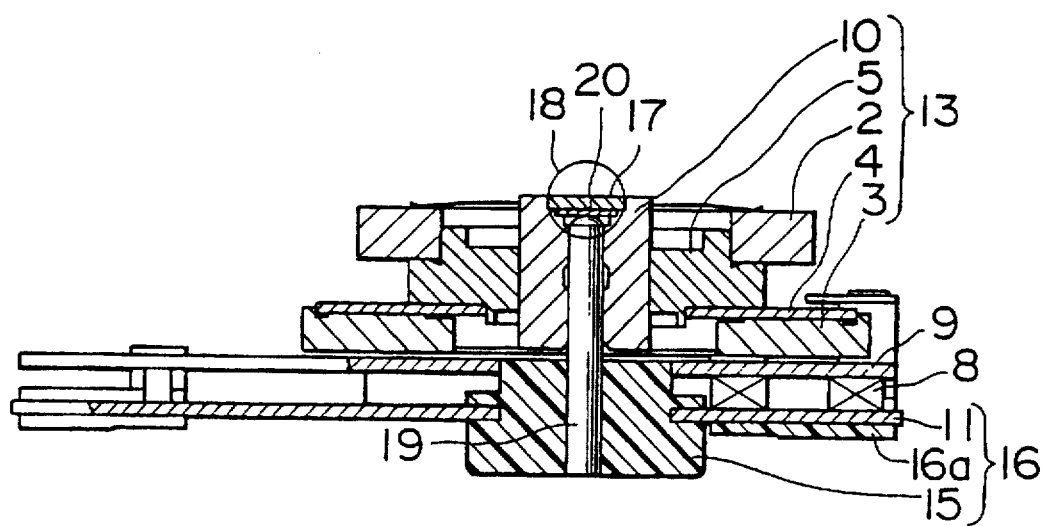
FIG. 2 is a sectional view of a rotating polygon mirror driving apparatus in accordance with a second embodiment of the present invention.
Figure 3:
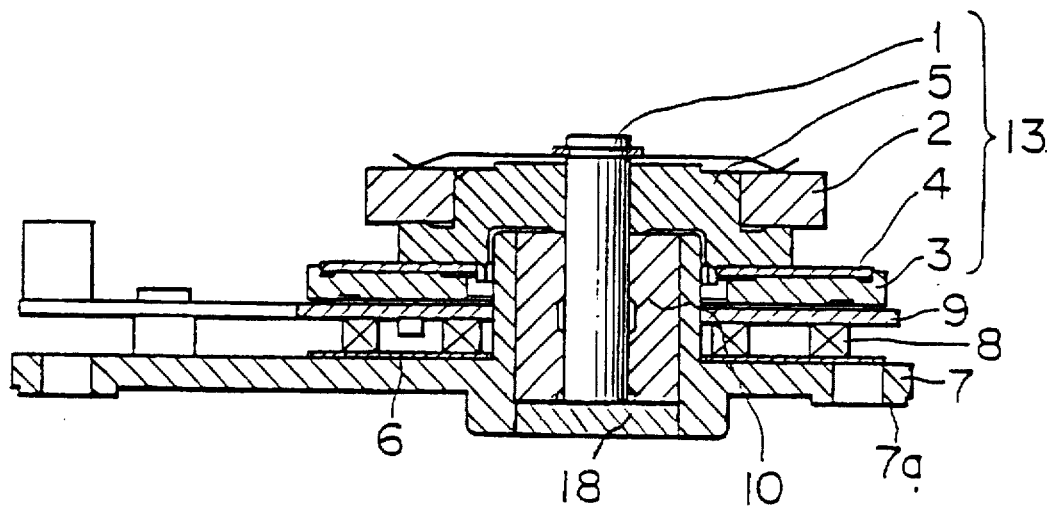
FIG. 3 is a sectional view of a first example of the conventional rotating polygon mirror driving apparatuses.
Figure 4:
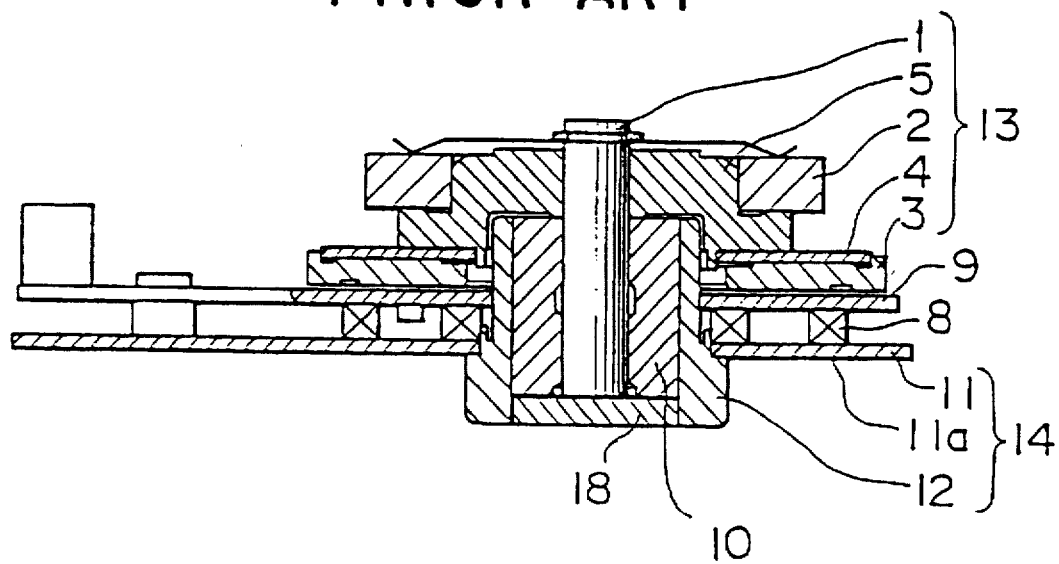
FIG. 4 is a sectional view of a second example of the conventional rotating polygon mirror driving apparatuses.

FIG. 2 shows another embodiment of the present invention in which a fixed shaft 19 having a rounded tip is fixed to a bracket 16 having a collar 15 and a mounting portion 16a both of which are integrally outserted to a base 11, and a sleeve 10 is fixed to a rotor boss 5 and has a thrust plate 20 in contact with the rounded tip of the fixed shaft 19 and a thrust cover 17, both of which are fixed to one end of the sleeve 10 to form a pivot bearing 18.

Although, in the embodiments, the bearing is a dynamic pressure bearing, a bearing comprising an oil-containing metal will provide the same effects.

As described above, the rotating polygon mirror driving apparatus of the present invention comprises the rotor having the rotational shaft having the rounded tip, the rotor magnet and the rotating polygon mirror fixed thereto; the bracket comprising the base plate made of a magnetic material and provided opposite to the rotor magnet to form a magnetic path, and the bearing holding portion outserted to the base plate and made of a resin; the sleeve fitted to the bracket so as to support the rotational shaft; and the thrust plane provided at one end of the sleeve so as to contact the rounded tip of the rotational shaft. The present invention can realize a rotating polygon mirror driving apparatus having the following excellent advantages:

(1) Even if the base plate is warped, since the collar is formed on the basis of the warped base plate, the squareness of the rotational shaft can be maintained, thereby preventing a mirror tilt relative to a reference plane to which the rotating polygon mirror driving apparatus is fixed.

(2) Since the collar is made of a resin, the rigidity thereof is lower than that of a metallic sleeve, and the coefficient of linear expansion can be close to that of the sleeve so that the sleeve can be assembled and maintained with substantially no change in the bore precision thereof. Particularly, when a change in the bore diameter of the fluid bearing of the sleeve significantly affects the loss and rigidity, the present invention exhibits significant effects.

(3) Since the collar can be formed without the caulking step or the like, the cost can be decreased.

(4) A low-cost pivot bearing can be formed by setting the thickness of the rotating polygon mirror to be slightly greater than the laser spot applied thereto, thereby decreasing the loss.

What is claimed is:

1. A rotating polygon mirror driving apparatus comprising:

a rotor having a rotating polygon mirror fixed thereto, a rotational shaft and a rotor magnet;

a bracket comprising (i) a base plate provided opposite to said rotor magnet, (ii) a cylindrical collar as a bearing holding portion, said cylindrical collar including a first portion comprising a resin material and having a cylindrical axis, and (iii) an apparatus mounting portion extending in a direction at right angles to the cylindrical axis of said collar, said mounting portion having a second portion comprising said resin material, said collar and said mounting portion being formed on said base plate by an outsert of said resin material; and a bearing comprising a bearing sleeve and fitted to said collar so as to rotatably support said rotational shaft.

2. A rotating polygon mirror driving apparatus according to claim 1, wherein said bearing is a dynamic pressure fluid bearing having a herringbone groove formed in one of said rotational shaft and said bearing sleeve for generating dynamic pressure.

3. A rotating polygon mirror driving apparatus according to claim 1, wherein said base plate comprises a magnetic material and forms a magnetic path together with said rotor magnet.

4. A rotating polygon mirror driving apparatus according to claim 1, wherein the coefficient of linear expansion of said resin ranges from $10 \times 10^{-6}$ to $25 \times 10^{-6}$ and is between the coefficients of linear expansion of said bearing sleeve and said base plate.

5. A rotating polygon mirror driving apparatus according to claim 1, wherein said apparatus mounting portion is formed on a side of said base plate which is remote from said rotor magnet.

* * * * *